United States Patent [19]
Murphy et al.

[11] Patent Number: 4,989,579
[45] Date of Patent: Feb. 5, 1991

[54] BARBECUE GRILL

[75] Inventors: Armand Murphy, Phenix City; John Seal, Auburn, both of Ala.; Robert C. Scroggs; James R. Carden, both of Columbus, Ga.

[73] Assignee: W.C. Bradley Co., Columbus, Ga.

[21] Appl. No.: 393,420

[22] Filed: Aug. 11, 1989

[51] Int. Cl.$^5$ ............................................. F24C 3/00
[52] U.S. Cl. ................................................. 126/41 R
[58] Field of Search ..................................... 126/41 R

[56] References Cited
U.S. PATENT DOCUMENTS 4,188,937 2/1980 Baynes ............................. 126/41 R
4,729,364 3/1988 Dailey .............................. 126/41 R

*Primary Examiner*—Carroll B. Dority
*Attorney, Agent, or Firm*—Thomas & Kerr

[57] ABSTRACT

A barbecue grill is disclosed having a fire box and a hood connected thereto, the fire box being inwardly tapered toward the bottom thereof and the hood being inwardly tapered toward the top thereof for reducing the overall material required for the grill while maintaining the same cooking area. The fire box includes integral seating portions for the burner, the burner includes receiving portions for the seating portions, and the fire box also includes an integral gas collecting dam around the ignitor port.

22 Claims, 3 Drawing Sheets

BARBECUE GRILL

BACKGROUND OF THE INVENTION

Gas-fired barbecue grills have experienced a tremendous growth in popularity since their introduction. Most such grills are characterized by a rectangular box-like structure with a hinged lid and a burner mounted in the bottom of the grill casting. The burner is connected to a gas supply line and is used to heat lava rock or charcoal briquettes designed for gas grills for cooking food thereover.

The grill castings are normally made of aluminum or steel and are quite durable. Certain grill components, and particularly the burners, are also made of aluminum or steel, but of a much smaller gauge. The burners are subjected to a more severe function and, as such, have a much shorter service life than the casting itself. Thus, many manufacturers have developed universal replacement burners to substitute for the original model as it becomes worn. In order for such replacement burners to fit diverse types and models of grills, even from the same manufacturer, the replacement models required adjustable seating means for stabilizing the burner against the floor of the grill. In addition many of the burners required collector boxes, which are typically appendages off of the body of the burner, that are used in conjunction with an electronic starter for igniting the gas.

Thus, where new burners are required, it is necessary to supply many more parts than are actually needed due to the diverse types of grills. The configuration of the grills, i.e., rectangular, also suffers from a lack of efficiency in that much of the casting goes unused or suffers from poor heat circulation. It is also relatively difficult to see the food being cooked with a rectangularly shaped grill, leading to further inefficiency, as the lid must be continuously lifted to check on the food being cooked.

SUMMARY OF THE INVENTION

It is, therefore, one of the principal objects of the present invention to provide a gas-fired barbecue grill that is designed to more efficiently utilize material in the body or grill casting and to provide superior heat circulation over prior art designs.

Another object of the present invention is to provide a barbecue grill wherein the seating means for the burner are integrally designed into the floor of the grill casting or fire box and the burner is designed to receive the seating means.

A further object of the present invention is to provide a barbecue grill wherein the collector means for receiving and containing gas near the ignitor is integrally designed into the floor of the grill casting and the burner is designed to direct gas into the collector means.

A still further object of the present invention is to provide a grill casting wherein the distance across the apex of the hood or cover is less than approximately one-half the width of the cooking grate, providing a triangular shape for both upper and lower portions of the grill casting while maintaining the same cooking area as prior art designs.

An additional object of the present invention is to provide a barbecue grill burner with venturi tubes designed to direct gas to the outer reaches of the burner and which burner can be inexpensively produced and maintained.

These and additional objects are attained by the present invention which relates to a gas-fired barbecue grill having a unique triangular lid portion and an angled bottom portion which reduces the overall material required to construct the grill while maintaining the same overall cooking area as a conventional rectangular grill of similar size. The bottom casting is designed with integral seating means for the burner and an integral collector means for directing gas to an ignitor. Thus, the burner is designed with receiving means for the seating means and means to direct the gas into the integral collector means. The burner venturi tubes have also been redesigned to direct gas towards the outer portions of the burner as well as the outlets near the collector means.

Various additional objects and advantages of the present invention will become apparent from the following description, with reference to the accompanying drawings.

DETAILED DESCRIPTION OF THE PREFERRED EMBODIMENT

Figure 1:
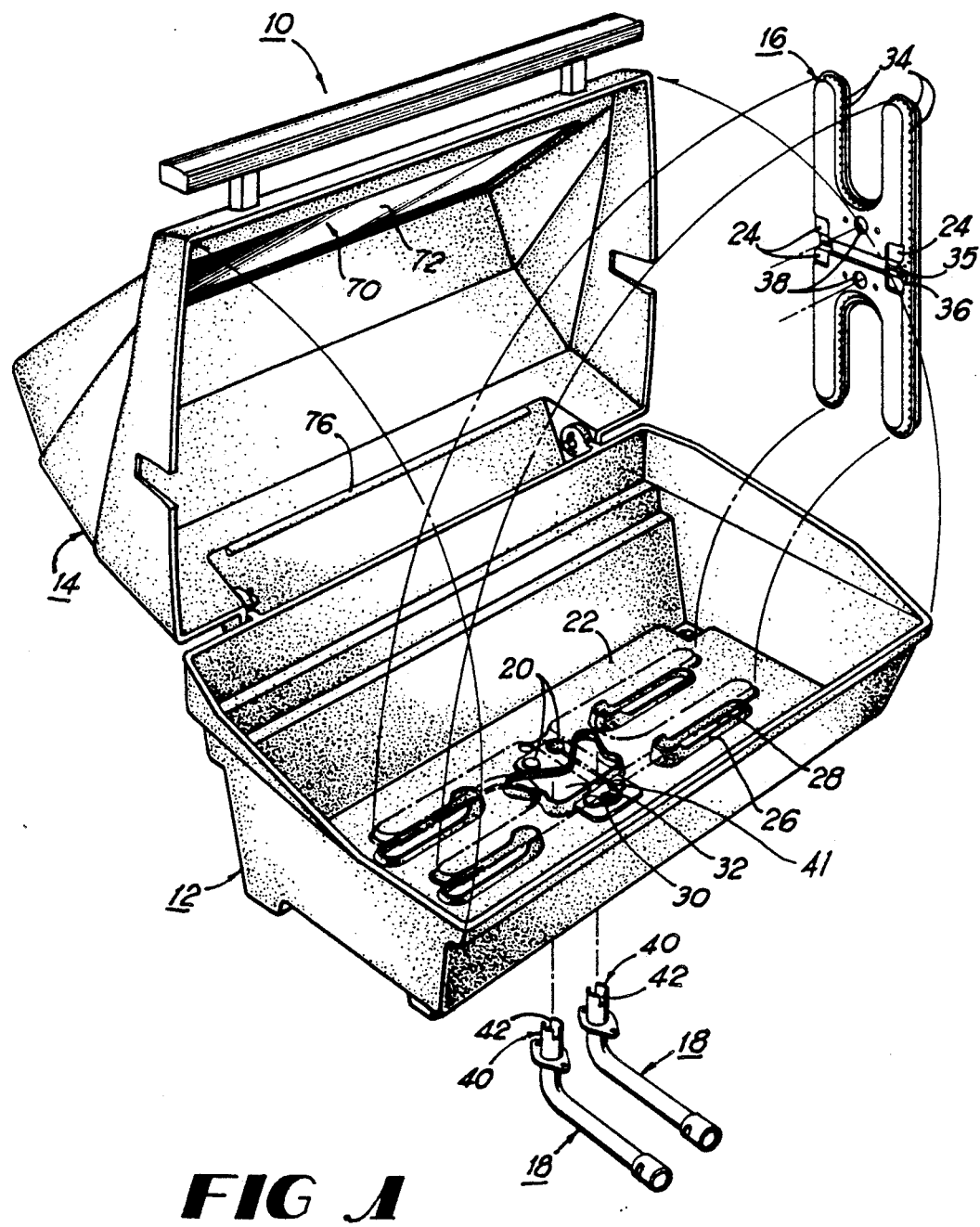
FIG. 1 is an exploded perspective view of the present gas barbecue grill assembly, illustrating a dual burner model.

Referring now more specifically to the drawings, and to FIG. 1 in particular, numeral 10 designates generally the present gas barbecue grill assembly. The grill in general includes a bottom body portion or fire box 12, an upper body portion or hood 14, a burner 16, and venturi tubes 18 which are connected to a source of fuel (not shown) and serve as conduits between the gas supply and the burner. While the discussion herein is directed to gas-fired barbecue grills, in speaking of a fuel source, it is to be understood that an electric heating element may be substituted for the gas burner in the present unique casting design.

In prior art grills, the floor of the fire box is substantially flat, but since the burner has to be raised above the floor the burner had to be provided with some means of supporting feet. In the present invention, however, integral seating means for the burner are provided in the form of raised knobs 20, formed in a regular, generally rectangular pattern near the center of the fire box floor 22. These knobs provide support for the center of the burner, which itself is provided with corresponding indentations 24 which receive the knobs and center the burner. Support for the extremities of the burner is provided by raised flanges 26 which surround the air inlets 28 formed in the floor 22.

The integrated design of the floor 22 and the burner 16 provides eight support points for the dual "H" burner instead of the normal four or fewer. Thus, this type of burner is extremely stable and requires no tools or special adjustments for installation.

Figure 3:
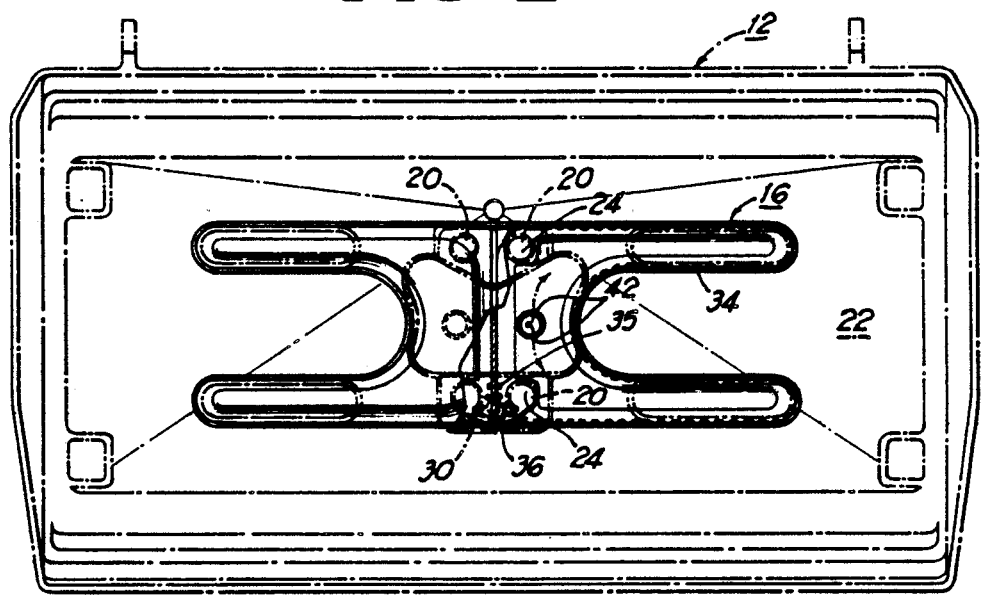
FIG. 3 is a partial cross sectional and top plan view of the bottom of the grill casting with the burner mounted therein, the section being taken on line 3—3 of FIG. 2.

An additional feature designed into the floor of the fire box is a collector means or dam 30. The dam is generally semicircular in design and is located around an aperture 32 which receives the electronic ignitor (not shown). In conventional burners, gas ports are provided around the perimeter thereof. In the present burner, the gas ports 34 are also provided around the perimeter but are extended around the inner corners 36 at the front of the burner, as shown in FIGS. 1 and 3. The additional ports 35 direct the gas to the dam 30 for ignition. This design provides more positive and quicker ignition than with prior art burners, which increases the safety of the grill. The design also eliminates the need for a conventional collector box which, as noted, is typically an appendage spot-welded to the burner near the ignitor port.

The above elements designed into the grill floor are also easily formed as the fire box is cast, providing substantial economies in production and in the elimination of the convention collector box and supporting feet for the burners. The burners are also economically produced, typically in a stamping operation, with no welding required for the production thereof.

The venturi tubes for the present grill have also been redesigned. In prior art burners, the venturi tubes typically have a flat mounting flange which is secured flush to the bottom of the burner. The burner of the present invention is provided with recessed port means 38 for receiving the proximal ends 40 for the venturi tubes. These proximal ends extend through a central cut out 41 in the floor of the fire box and are provided with cut out portions 42 which direct the gas toward the front and rear areas of the burners and, hence, around the corners to the outer portions as shown by the arrows, as well as to the corner ports 35 near the gas collector dam.

Figure 4:
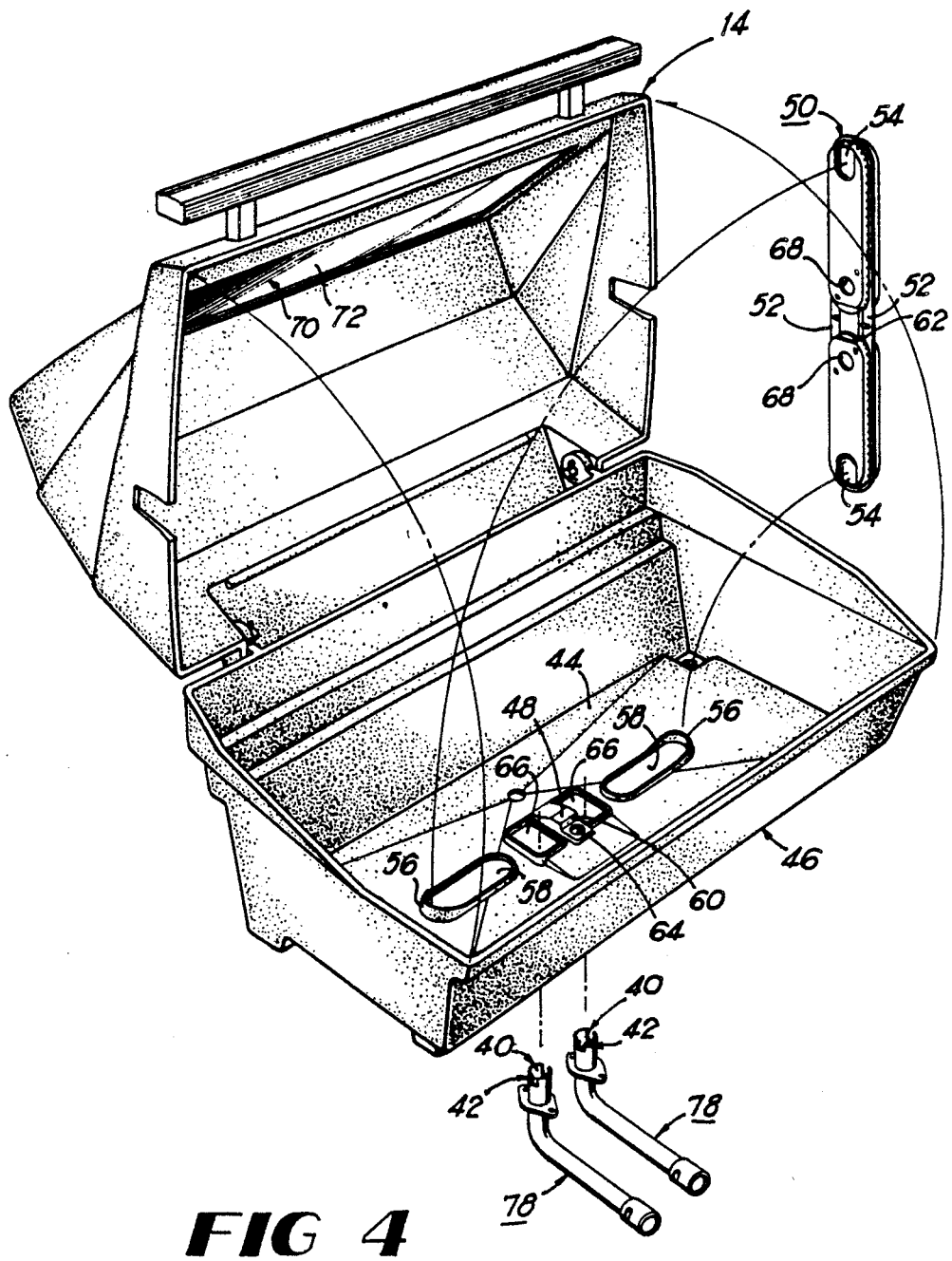
FIG. 4 is an exploded perspective view of an alternate embodiment of the present gas barbecue grill assembly, illustrating a single burner model.

Referring now to FIG. 4, an alternate embodiment of the present invention is illustrated, this embodiment showing a single, in-line burner for a smaller model grill. As in the previously described embodiment showing a single, in-line burner for a smaller model grill. As in the previously described embodiment, the seating means for the burner and the collector or dam are cast into the floor 44 of the fire box 46. The fire box 46 includes a central seating means 48 which seats and centers the single burner 50 by means of the indentations 52 formed in the bottom of the burner. The extremities of the burner also include indentations 54 which engage raised flanges 56 surrounding the air inlets 58. Thus, the burner is seated and centered without the need for supplemental feet or adjusting means.

The gas collector means or dam 60 is provided by the generally vertical wall depending from the central seating means 48. Gas is directed toward the dam through the corner ports 62 formed in the peripheral inner front corners of the burner, the ignitor (not shown) extending through aperture 64 to ignite the gas. The venturi tubes 18 are connected to the burner through centralized cut-outs 66 and extend into ports 68 in the burner. As with the previous embodiment, the venturi tubes have cut-out portions for directing gas to the outer portions of the burner and to the corner ports 62 near dam 60.

Figure 2:
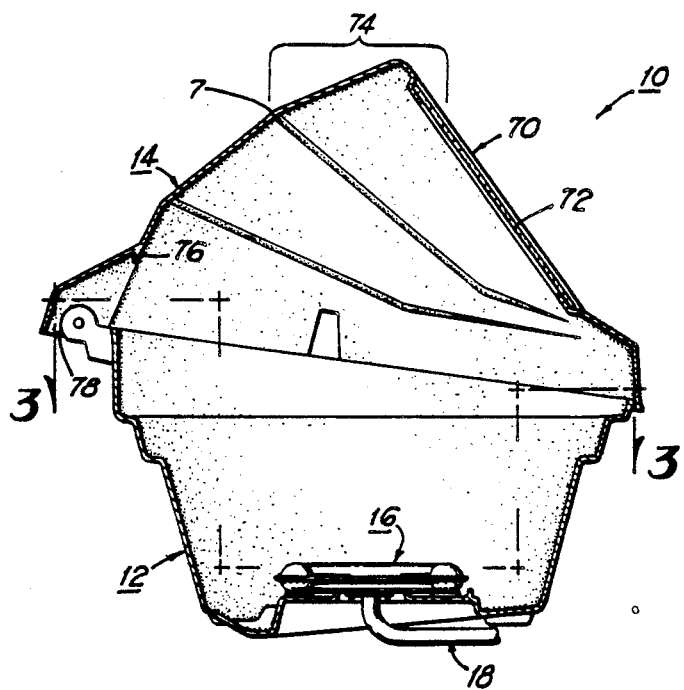
FIG. 2 is a cross sectional view of the present barbecue grill with the burner mounted therein.

Referring now in particular to FIGS. 1, 2, and 4, an additional unique feature of the present invention is illustrated. As noted hereinabove, prior art designs are normally rectangular, resulting in much unused area and greater material use in constructing the grill. The present grill is designed with a tapered fire box and a tapered hood, resulting in much less material usage while maintaining the same overall cooking area. The shape of the grill also provides improved heat circulation and the slanted from 70 of the hood 14 allows for a much larger and more conveniently located viewing window 72 for observing the cooking process. As shown in FIG. 2, the hood is formed with delineated regions near the apex of the hood 14, the lower edge of the upper region of the hood is designed with a certain width 74, defined as the distance between the delineation at point 7 at the rear of the hood and extending laterally to the slanted front portion 70, and is less than approximately one-half of the width of the cooking surface. Thus, the same cooking area is provided as in a rectangular grill of similar size with as much as one-third less material. The design of the hood also provides for improved functioning of a drip-directing lip 76 which is integrally formed on the inside surface of the hood.

Heat circulation around the food being cooked is improved due to the angled shaping of the fire box and hood and the elimination of "dead spots" as are found in rectangular grills where the heat is concentrated at the top of the grill. The air outlet 78 at the rear of the hood directs air and thus, heat flow, out the rear of the hood and down the sloping rear portion, providing more even cooking performance.

Thus, while an embodiment of a gas barbecue grill and modifications thereof have been shown and described in detail herein, various additional changes and modifications may be made without departing from the scope of the present invention.

What is claimed is:

1. A barbecue grill having a fuel source and means for supporting a radiant material and for supporting food to be cooked thereon, said grill comprising a fire box with a burner element mounted therein, said fire box also receiving said support means, a hood member for covering said fire box and having an apex, said fire box including a floor portion having an integral collector means projecting upwardly therefrom for receiving fuel from said burner element, said burner element having a lower surface overlying said collector means for forming a gas collection chamber with said collector means, and said burner element has a plurality of port means near said collector means for directing fuel thereto.

2. A barbecue grill as defined in claim 1 in which said fire box includes a floor portion having integral seating means formed therein for receiving said burner element.

3. A barbecue grill as defined in claim 2 in which said burner element includes receiving means corresponding to said seating means for locating and supporting said burner element in said fire box.

4. A barbecue grill as defined in claim 1 in which said grill includes venturi means having a proximal end secured to said burner element and a distal end to said fuel source for conducting fuel to said burner, with said venturi means including cut out portions in said proximal ends for directing fuel into said burner element.

5. A barbecue grill for cooking food and having a fuel source, said grill comprising a lower body portion having a floor with a burner element mounted therein, said floor having seating means integrally formed therein and said burner element having indented receiving means formed integrally therein and corresponding to said seating means for locating said burner element in said lower body portion, and an upper body portion hingedly connected to said lower body portion for selectively covering said lower body portion.

6. A barbecue grill as defined in claim 5 in which said upper body portion has a generally triangular configuration with an apex and said lower body portion has a cooking grate supported therein.

7. A barbecue grill as defined in claim 5 in which said floor has a dam formed therein for receiving and collecting gas from said burner element for ignition therein.

8. A barbecue grill as defined in claim 5 in which said grill includes venturi means having a proximal end secured to said burner element and a distal end to said fuel source for conducting fuel to said burner, with said venturi means including cut out portions in said proximal ends for directing fuel into said burner element.

9. A barbecue grill for cooking food and having means for supporting said food and a fuel source for cooking, said grill comprising a lower fire box portion and an upper hood portion hingedly connected thereto for covering said fire box portion, said fire box portion having a burner element mounted therein and including a floor surface with means for seating said burner disposed thereon, said grill including venturi means having a proximal end secured to said burner element and a distal end in communication with said fuel source for conducting fuel to said burner, with said venturi means including cut out portions in said proximal ends for directing fuel into said burner element, and said hood portion having a sloping front surface with a viewing window therein for observing the food being cooked.

10. A barbecue grill as defined in claim 9 in which said upper body portion has a generally triangular configuration with an apex and said lower body portion has a cooking grate supported therein.

11. A barbecue grill as defined in claim 10 in which said burner element includes receiving means corresponding to said seating means for locating and supporting said burner element in said fire box.

12. A barbecue grill as defined in claim 9 in which said burner element includes receiving means corresponding to said seating means for locating and supporting said burner element in said fire box.

13. A barbecue grill as defined in claim 9 in which said fuel source is gas and said floor surface has a collector means disposed below said burner element for collecting gas from said burner element for ignition therein.

14. A barbecue grill as defined in claim 13 in which said burner element has directional gas ports for directing gas to said collector means.

15. A barbecue grill for cooking food and having means for supporting food and a fuel source for cooking, said grill comprising a lower fire box portion and an upper hood portion hingedly connected thereto for covering said fire box portion, said fire box portion having a burner element mounted therein and including a floor surface with means for seating said burner disposed thereon, said floor surface also including a collector means disposed below said burner element defining a gas collection chamber in combination with said burner element for collecting the fuel from said burner element for ignition.

16. A barbecue grill as defined in claim 15 in which said grill includes venturi means having a proximal end secured to said burner element and a distal end in communication with said fuel source for conducting fuel to said burner, with said venturi means including cut out portions in said proximal ends for directing fuel into said burner element.

17. A barbecue grill as defined in claim 15 in which said burner element has directional gas ports for directing gas to said collector means.

18. A barbecue grill having means for supporting a radiant material and for supporting food to be cooked thereon, said grill comprising a fire box with a burner element mounted therein, said fire box also receiving said support means, a hood member for covering said fire box and having a triangular cross-section with an apex and a sloping front surface, said hood having a rear surface comprised of a plurality of delineated regions each at an angle to an adjacent region and extending from a rear lower edge of said hood member to said apex, a window extending substantially across the width of the front of said hood member and from a lower region to adjacent said apex, and said apex being located in a vertical plane slightly forward of a plane intermediate front and rear edges of said fire box.

19. A barbecue grill as defined in claim 18 in which said fire box includes a floor portion having integral seating means formed therein for receiving said burner element.

20. A barbecue grill as defined in claim 19 in which said burner element includes receiving means corresponding to said seating means for locating and supporting said burner element in said fire box.

21. A barbecue grill as defined in claim 18 in which said fire box includes a floor portion having an integral collector means projecting upwardly therefrom for receiving gas from said burner element and said burner element has a plurality of gas ports near said collector means for directing gas thereto.

22. A barbecue grill as defined in claim 18 in which said grill includes venturi means having a proximal end secured to said burner element and a distal end in communication with said fuel source for conducting fuel to said burner, with said venturi means including cut out portions in said proximal ends for directing fuel into said burner element.

* * * * *